United States Patent [19]

Heamon

[11] Patent Number: 4,640,497

[45] Date of Patent: Feb. 3, 1987

[54] FILTRATION APPARATUS

[75] Inventor: Mark L. Heamon, Hendersonville, N.C.

[73] Assignee: Swiss Aluminium Ltd., Chippis, Switzerland

[21] Appl. No.: 791,604

[22] Filed: Oct. 25, 1985

[51] Int. Cl.$^4$ ............................................. C22B 21/06
[52] U.S. Cl. ................................. 266/227; 210/773; 75/93 R
[58] Field of Search ..................... 266/227; 75/93 R; 210/510.1, 773

[56] References Cited

U.S. PATENT DOCUMENTS

| | | | |
|---|---|---|---|
| 3,006,473 | 10/1961 | Gamber | 75/68 R |
| 4,113,241 | 9/1978 | Dore | 266/227 |
| 4,277,281 | 7/1981 | Weber et al. | 266/227 |
| 4,427,185 | 1/1984 | Meyer | 266/220 |
| 4,444,377 | 4/1984 | Groteke et al. | 266/227 |

Primary Examiner—Melvyn J. Andrews
Attorney, Agent, or Firm—Bachman & LaPointe

[57] ABSTRACT

Improved filtration apparatus including a filter chamber having a metal inlet and a metal outlet defining a molten metal flow path therebetween and a filtration assembly engageable therewith disposed between the inlet and the outlet.

14 Claims, 3 Drawing Figures

FILTRATION APPARATUS

BACKGROUND OF THE INVENTION

Molten metal, particularly molten aluminum, in practice generally contains entrained solids which are deleterious to the final cast metal product. These entrained solids appear as inclusions in the final cast product after the molten metal is solidified and cause the final product to be less ductile or to have poor bright finishing and anodizing characteristics. The inclusions may originate from several sources. For example, the inclusions may originate from surface oxide films which beome broken up and are entrained in the molten metal. In addition, the inclusions may originate as insoluble impurities, such as carbides, borides and others or eroded furnace and trough refractories.

Porous ceramic foam materials are known to be particularly useful in filtering molten metal, as described in U.S. Pat. No. 3,893,917 for "Molten Metal Filter" by Michael J. Pryor and Thomas J. Gray, patented July 8, 1975, and also as described in U.S. Pat. No. 3,947,363 for "Ceramic Foam Filter" by Michael J. Pryor and Thomas J. Gray, patented on March 30, 1975, U.S. Pat. No. 4,081,371 for "Filtering of Molten Metal" by John C. Yarwood, James E. Dore and Robert K. Preuss, patented March 28, 1978, and U.S. Pat. No. 4,024,056 for "Filtering of Molten Metal" by John C. Yarwood, James E. Dore and Robert K. Preuss, patented May 17, 1977.

These ceramic foam materials are particularly useful for filtering molten metal for a variety of reasons included among which are their excellent filtration efficiency, low cost, ease of use and ability to use same on a disposable, throwaway basis. The fact that these ceramic foam filters are convenient and inexpensive to prepare and may be used on a throwaway basis requires the development of means for easily and conveniently assembling and removing porous, molten metal filters from a filtration unit while providing a highly efficient filtration assembly.

Since the filters are designed to be a throwaway item, it is essential to provide an effective means of seating the filters in place in its holder which is easy to assemble and disassemble. The holder or filter chamber itself is normally an itegral part of a trough, pouring pan or tundish, and should be constructed of refractory materials resistant to the molten metal similar to those used in standard trough construction. The filter plate is normally sealed in place using a resilient sealing means or gasket type seal peripherally circumscribing the filter plate. In order to effectively place the filter plate in position in the filter chamber, the prior art teaches the provision of a bevelled peripheral surface on the filter plate onto which the gasket seal is placed. The filter plate is then sealed in place by exerting a vertical pressure downwards on the filter plate in the filter chamber which is provided with a corresponding bevelled surface. It has been found that, as a result of the force exerted on the filter plate during assembly in the filter chamber, structural damage may result to the filter plate which could result in metal leakage and/or ineffective metal filtration. Naturally also, removal of the filter plate has been found to cause difficulties.

Furthermore, filtration assemblies commonly in use normally provide that the filter plate is horizontally disposed in the filter chamber. This horizontal disposition results in occupying a considerable amount of space in the metal line. It is desirable to provide a filtration assembly wherein the filter plate is vertically disposed since the vertical disposition will result in a space-saving arrangement.

Vertical dispositions of filter plates are known from, for example, U.S. Pat. No. 4,092,153. However, this patent simply teaches providing the filter plate with a bevelled peripheral surface mating with a like bevelled surface in a filter chamber so that the filter plate is inserted in the chamber in a similar manner as with the horizontally disposed filter plates. While the '153 patent effectively teaches a vertically disposed filter plate, it has been found in practice that this vertical disposition arrangement is not entirely satisfactory in view of metal freeze-up problems and problems associated with removal of the spent filter.

Accordingly, it is a principal object of the present invention to provide an improved molten metal filtration apparatus which is easy to use on a commercial scale.

It is a further object of the present invention to provide an improved molten metal filtration apparatus which is characterized by the vertical disposition of the filtration assembly.

It is a still further object of the present invention to provide an improved filtration apparatus as aforesaid which is characterized by convenient placement and removal of the filtration assembly.

Further objects of the present invention will appear hereinbelow.

SUMMARY OF THE INVENTION

In accordane with the present invention, it has been found that the foregoing objects and advantages are readily obtained. The improved molten metal filtration apparatus of the present invention comprises a filter chamber having a molten metal inlet and a molten metal outlet defining a molten metal flow path therebetween, a filtration assembly, preferably substantially vertically disposed, engageable with said filter chamber and disposed between said inlet and outlet including a solid, plate-like member resistant to said molten metal blocking said flow path and a porous filter member seated in the solid member permitting flow of molten metal therethrough. The porous member is preferably a ceramic foam filter and may be in line with said inlet and outlet. In the refered embodiment, the ceramic foam filter has a bevelled edge to tightly seat in a mating bevelled edge of the solid member.

It is preferred to provide at least two engaging means, and optimally at least three, on said filter chamber for engagement with at least two filtration assemblies to enable the use of two filtration assemblies in line or to enable placement of a second filtration assembly and removal of the first filtration assembly in an easy and convenient manner, as for example, wihtout interrupting metal flow. It is also preferred to provide a plate-like baffle member engageable with said filter chamber between the filtration assembly and inlet to force metal to the bottom of the filter bowl and to prevent floating inclusions from reaching the filter.

Further features of the present invention will appear hereinbelow.

BRIEF DESCRIPTION OF THE DRAWINGS

The present invention and features thereof will be more readily understandable from a consideration of the following illustrative drawings wherein.

DETAILED DESCRIPTION

Figure 1:
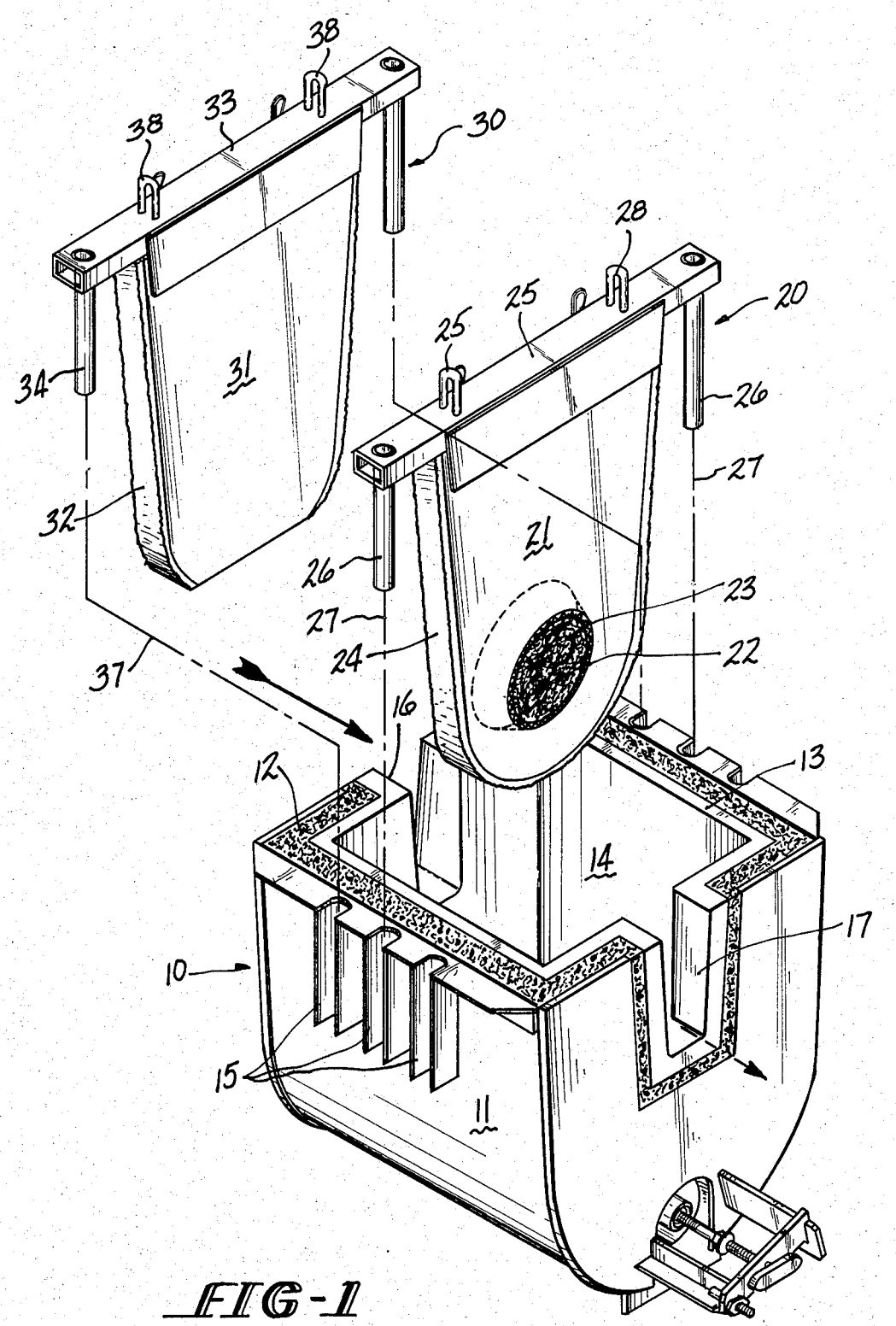
FIG. 1 is a perspective view with the baffle plate and filtration assembly removed.

Referring to FIG. 1, filter bowl 10 is provided preferably with an outer steel shell 11, insulated core 12 and metal resistant lining 13, as for example, a ceramic, defining an inner filter chamber 14. The filter bowl must naturally be resistant to the molten metal with which it is used so that it is preferred to use a steel shell lined with a lightweight insulated casting. The function of the filter bowl is to contain the molten metal and direct the flow through the filter. The internal configuration of the filter bowl will mate with the external configuration of the filtration assembly and baffle plate as will be described hereinbelow. Fitler bowl 10 is provided with engaging means for engaging the filtration assemblies and baffle palte, as for example, three external pairs of slots 15 whose function will be described hereinbelow. Also, the filter bowl 10 is provided with a metal inlet 16 and a metal outlet 17 with the direction of metal flow being shown by the arrows.

Filtration assembly 20 is provided including a plate-like solid member 21 resistant to the molten metal being filtered and a porous filtration member 22 seated in solid member 21 permitting flow of molten metal therethrough. The porous filtration member is preferably a ceramic foam filter prepared in accordance with the description of U.S. Pat. No. 3,962,081. This patent describes a ceramic foam filter prepared by impregnating a polyurethane foam with a ceramic slurry and firing the impregnated material to form a ceramic foam material in the configuration of the original polyurethane foam. Naturally, however, any porous filtration material may be used.

The porous filter member is seated in the solid member, preferably using a gasket material 23 between the peiphery of the porous member 22 and the solid member 21 so as to tightly seat the porous member in the solid member. As shown in FIG. 1, it is preferred to use a round filter member with a bevelled peripheral edge mating in a like bevelled peripheral edge of the solid member.

Figure 2:
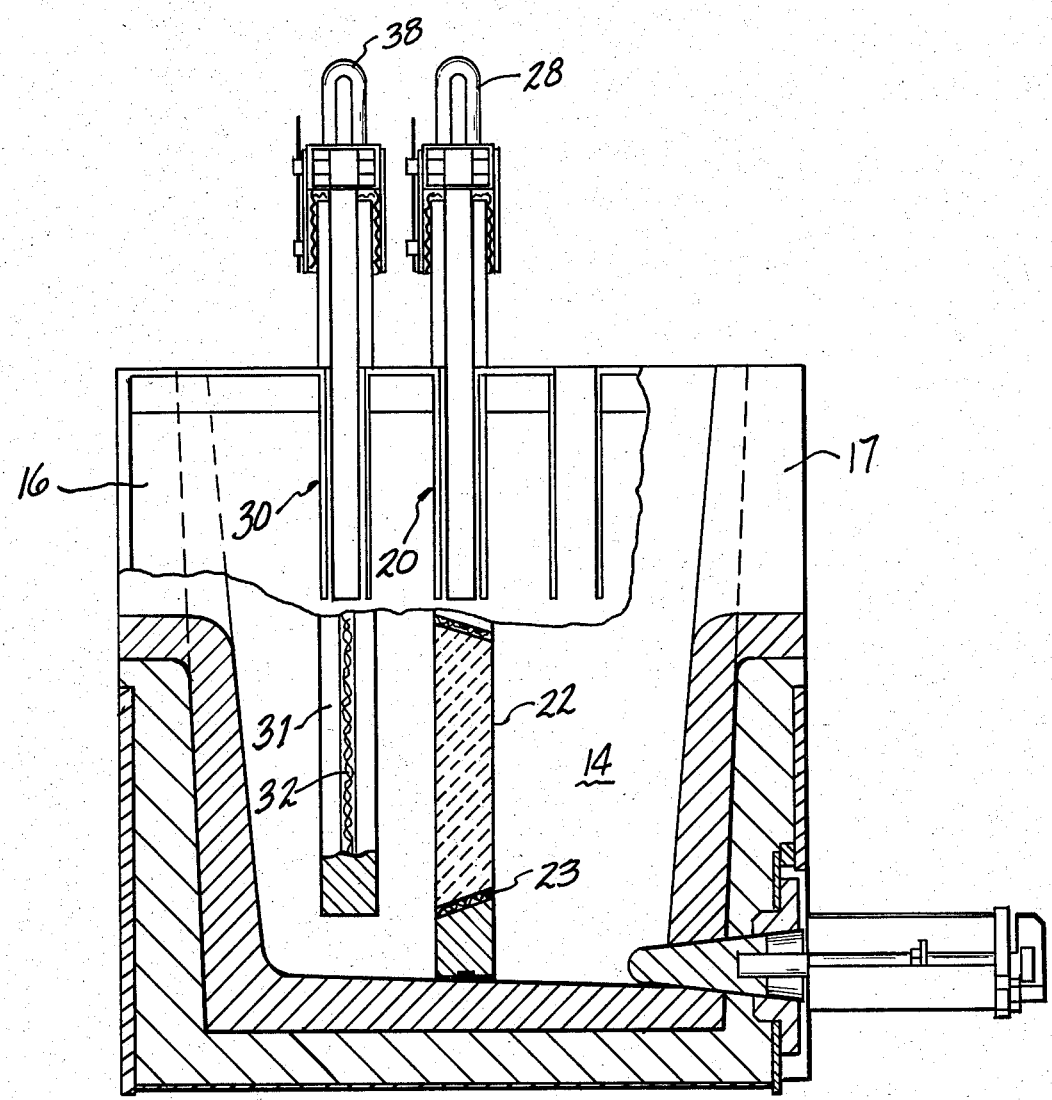
FIG. 2 is a partial section view of the filter chamber with baffle plate and filtration assembly in place.
Figure 3:
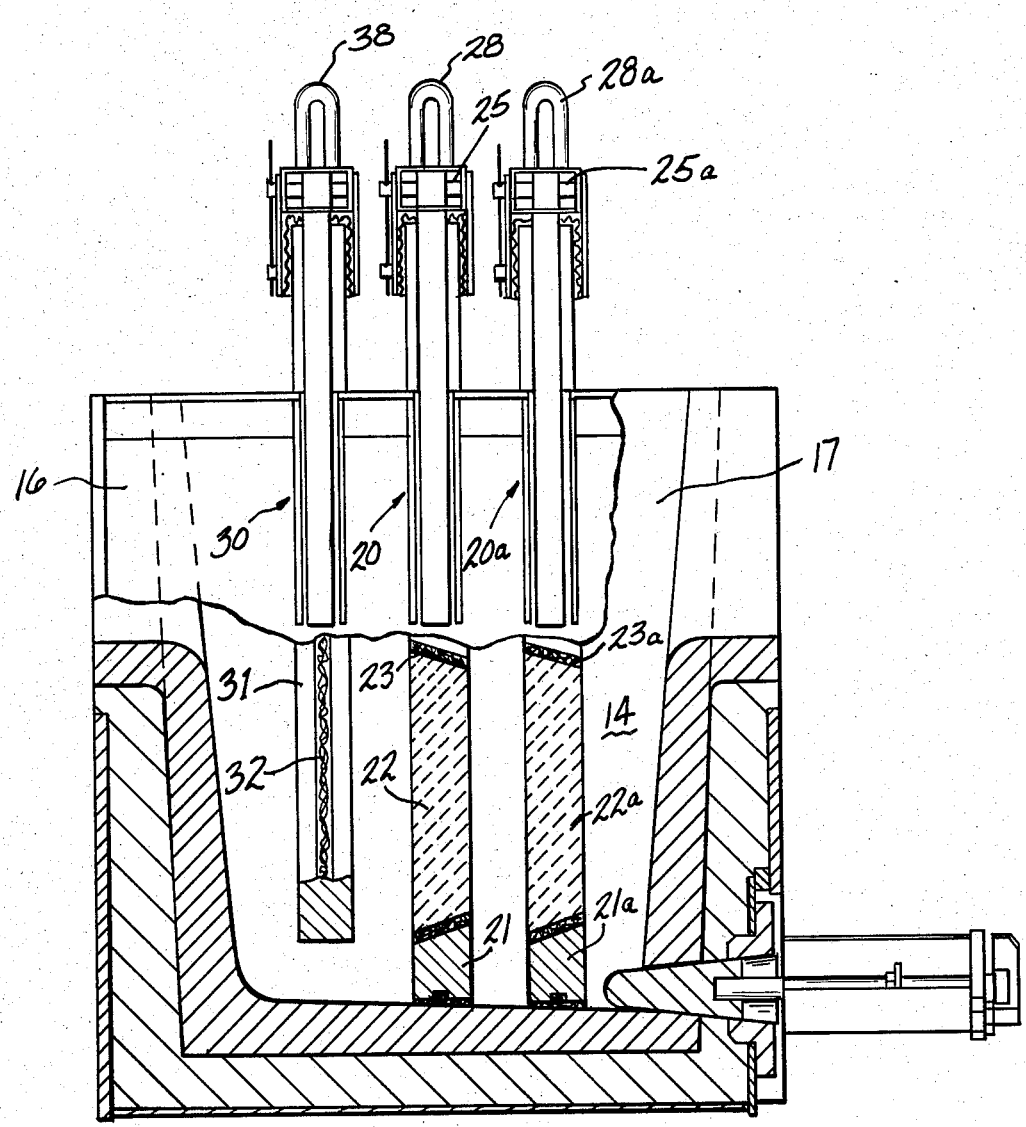
FIG. 3 is a partial section view similar to FIG. 2 using two filtration assemblies in line.

The solid member is provided with gasket material 24 circumscribing the perimeter thereof and support means 25 having depending flanges 26 engageable with slots 15 so as to seat the filtration assembly in the filter bowl 10 in the manner shown in FIGS. 2 and 3. Dotted lines 27 show the path of flanges 26 to engage with the middle of said slots 15. As shown in FIGS. 1 and 2, the solid member 21 will completely block the filter chamber 14 so that molten metal flowing through the filter chamber will be forced to flow through porous member 22. Support means 25 is provided with hooks 28 to provide a lifting site for removal of filtration assembly from the filter bowl. The gasket materials can be any of the known high temperature low density compressible ceramic fiber materials or other known gasketing materials functioning to provide a seal between the edge of solid member 21 and filter chamber 14 and between the edge of porous member 22 and solid member 21.

It is preferable to provide a plate-like baffle 30 which is a solid member 31 resistant to molten metal having a peripheral gasket 32 circumscribing the solid member 31 and having a support means 33 similar to support means 25. Support 33 is also provided with depending flanges 34 which mate with the forward-most of said pairs of slots 15 in a manner after filtration assembly 20. Baffle plate 30 engages with the forward-most pair of slots 15 along dotted lines 37 and incldues hooks 38 for removal of the baffle plate assembly. The function of the baffle plate is to improve temperature distribution and to force metal to the botttom of the filter bowl and also to prevent floating inclusions from reaching the filter. Thus, as shown in FIGS. 2 and 3 the baffle plate is placed between the filter assembly 20 and inlet 16.

It is readily possible in accordance with the present invention to provide a plurality of filtration assemblies, as a second filtration assembly by utilizing second filtration assembly 20a (see FIG. 3). The second filtration assembly is similar to filtration assembly 20 and includes solid member 21a, porous filtration member 22a and gasket material 23a circumscribing the porous member 22a. Similarly, support means 25a is provided with hooks 28a in a manner after filtration assembly 20.

In the preferred embodiment one normally preheats the filtration assembly prior to insertion in the filter bowl. This is not essential but it has been found to be desirable for best operations. A separate preheat chamber may be provided adjacent the filter bowl so as to elevate the temperature of the porous member and solid member before the filtration assembly is inserted into the molten metal. Preheating has been found to reduce temperature loss in the metal, thermal shock in the filter and facilitates priming of the filter.

In operation, it is preferred to insert the filtration assembly in the middle slot of the filter bowl. Thus, when it is desired to change filters either during a casting operation or after the end of a casting operation, the second preheated filtration assembly 20a is placed into the dowstream slot of the filter bowl. With the downstream filter assembly firmly seated, the middle filter assembly 20 can be conveniently and easily removed from the filter bowl without interruption of the casting operation if necessary. When it is necessary to change filters again, a preheated filtration assembly can then be placed in the middle slot and the downstream spent filtration assembly can be easily removed.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An improved molten metal filtration apparatus comprising a filter chamber having an internal surface for contact with molten metal, an external surface out of contact with molten metal, a molten metal inlet and a molten metal outlet defining a molten metal flow path therebetween, a removable filtration assembly engageable with said filter chamber and disposed between said inlet and outlet including a solid, plate-like member resistant to said molten metal completely blocking said flow path, a porous filter member seated in said solid member permitting flow of molten metal therethrough so that molten metal flowing through the filter chamber will flow through the porous filter member and means on said external surface for engaging and disengaging said filtration assembly from the filter chamber.

2. An apparatus according to claim 1 wherein said filtration assembly is substantially vertically disposed.

3. An apparatus according to claim 1 wherein said porous filter member is a ceramic foam filter.

4. An appartus according to claim 1 wherein said porous filter member is round with a bevelled edge to tightly seat in said solid member.

5. An apparatus according to claim 4 including a peripheral gasket circumscribing said porous filter member.

6. An apparatus according to claim 1 including a peripheral gasket circumscribing said solid member disposed between said filtration assembly and filter chamber.

7. An apparatus according to claim 1 including a second solid, plate-like baffle member disposed between said inlet and said porous filter member partially blocking said flow path.

8. An appartus according to claim 1 including a second filtration assembly disposed downstream of said filtration assembly and upstream of said outlet so as to provide two of said porous filter members in series.

9. An apparatus according to claim 1 wherein said filter chamber external surface includes at least two sets of slots and the filtration assembly includes flanges mating with one of said sets for seating the filtration assembly in said filter chamber.

10. An apparatus according to claim 9 including three of said sets of slots wherein said filtration assembly is seating in the middle slot.

11. An apparatus according to claim 10 including a plate-like baffle seated in the first set of slots upstream of said filtration assembly.

12. An apparatus according to claim 11 including a second filtration assembly seated in the third of said slots downstram of said filtration assembly.

13. An apparatus according to claim 1 including means on said filtration assembly permitting removal of the filtration assembly from said filter chamber.

14. An apparatus according to claim 7 wherein said plate-like baffle member is operative to force molten metal to the bottom of the filter chamber and to prevent floating inclusions from reaching the porous filter member.

* * * * *